US008867757B1

(12) United States Patent
Ooi (10) Patent No.: US 8,867,757 B1
(45) Date of Patent: Oct. 21, 2014

(54) MICROPHONE UNDER KEYBOARD TO ASSIST IN NOISE CANCELLATION

(71) Applicant: Google Inc., Mountain View, CA (US)

(72) Inventor: Leng Ooi, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/930,008

(22) Filed: Jun. 28, 2013

(51) Int. Cl.
- *A61F 11/06* (2006.01)
- *H03B 29/00* (2006.01)
- *G10K 11/16* (2006.01)
- *H04R 3/00* (2006.01)

(52) U.S. Cl.
CPC .................................. *H04R 3/002* (2013.01)
USPC ............ 381/71.3; 381/71.9; 381/91; 381/122

(58) Field of Classification Search
USPC ......... 381/71.1–71.14, 71.3, 94.1, 94.7, 94.8, 381/94.9, 91, 92, 122; 181/206; 345/168–172
See application file for complete search history.

(56) References Cited

U.S. PATENT DOCUMENTS

| 5,613,011 | A  | * | 3/1997  | Chase et al. ................... 381/361 |
| 5,930,372 | A  | * | 7/1999  | Kuriyama ..................... 381/71.9 |
| 6,935,797 | B2 | * | 8/2005  | Sim ............................... 400/472 |
| 7,254,537 | B2 | * | 8/2007  | Otani et al. ................... 704/233 |
| 7,519,186 | B2 | * | 4/2009  | Varma et al. ................. 381/94.7 |
| 7,693,293 | B2 | * | 4/2010  | Nemoto et al. .............. 381/94.5 |
| 8,019,089 | B2 | * | 9/2011  | Seltzer et al. ................ 381/71.1 |
| 8,213,635 | B2 | * | 7/2012  | Li et al. ........................ 381/94.1 |
| 8,265,292 | B2 | * | 9/2012  | Leichter ....................... 381/71.1 |
| 2008/0279366 | A1 | * | 11/2008 | Lindbergh .................... 379/421 |

* cited by examiner

*Primary Examiner* — Xu Mei (74) *Attorney, Agent, or Firm* — Brake Hughes Bellermann LLP (57) ABSTRACT

A system includes a first housing that houses a plurality of mechanical keys. A first microphone that is configured to detect a dynamic noise is located within the first housing and under the mechanical keys. A second microphone is configured to detect acoustic waves that include speech and to convert the acoustic waves into an electrical audio signal. The dynamic noise is not associated with the detected speech. The system further includes a dynamic audio signal filter that is configured to suppress, in the electrical audio signal, dynamic noise, and the dynamic audio signal filter is activated in response to the first microphone detecting the dynamic noise.

19 Claims, 6 Drawing Sheets

MICROPHONE UNDER KEYBOARD TO ASSIST IN NOISE CANCELLATION

TECHNICAL FIELD

This description relates to noise cancellation, and, in particular, to a computing device having a microphone under a keyboard to assist in noise cancellation.

BACKGROUND

A person can use a system to communicate with a remote person. For example, a person may use the system to capture and transmit audio and video information from the user and to transmit this information to the remote person. In particular, the user may engage in a telephone call, audio chat, video conference, etc. with another person. The system may include a microphone captures audio information (e.g., speech) from a user for transmission to another person.

While the user of the computing device is communicating with the remote person, the microphone of the computing device may capture not only the desired audio information, but also background noise that is transmitted along with the desired audio information to the remote person. The presence of this background noise can be distracting or annoying to the remote person.

Therefore, it is desirable to reduce the background noise in the audio information transmitted to the remote person.

SUMMARY

This document describes systems and techniques that may be used to suppress dynamic noise in a signal that is detected by a microphone used with a computing device. For example, a first microphone located close to a source of dynamic noise (e.g., mechanical keys of a keyboard) can detect the presence of a dynamic noise (e.g., noise associated with the press of a key of the keyboard) and can generate a signal that a dynamic noise event has occurred. Then, in response to the signal, a dynamic audio signal filter can be triggered to suppress the dynamic noise in a signal that is detected by a second microphone. The various techniques described here can provide mechanisms for accurately detecting dynamic noise that may be disturbing if it were not suppressed in the signal that is detected by the second microphone.

In certain aspects, a system can include a first housing that houses a plurality of mechanical keys. A first microphone that is configured to detect a dynamic noise is located within the first housing and under the mechanical keys. A second microphone is configured to detect acoustic waves that include speech and to convert the acoustic waves into an electrical audio signal. The dynamic noise is not associated with the detected speech. The system further includes a dynamic audio signal filter that is configured to suppress, in the electrical audio signal, dynamic noise, and the dynamic audio signal filter is activated in response to the first microphone detecting the dynamic noise.

Implementations can include one or more of the following features. For example, the dynamic noise can be associated with a stroke of one of the mechanical keys. The plurality of mechanical keys can be located at a distance, D, from the second microphone, and the dynamic audio signal filter can be activated at a time, T, after the generation of the dynamic noise, where the distance, D, varies and where the time, T, depends on the distance, D. A processor can be configured to vary the time, T, based on an analysis of the electrical audio signal. The system can include a base portion, where the base portion includes the first housing and the plurality of mechanical keys, and a display portion that is moveably coupled to the base portion and that includes a display bezel, with the second microphone being housed in the display bezel.

The system can further include a second housing that houses a CPU and a keyboard peripheral to the second housing and operably connected to the CPU. The keyboard can include the first housing, the plurality of mechanical keys, and the first microphone, and the second microphone can be peripheral to the second housing and operably connected to the CPU. The system can further include a mouse, and the dynamic noise can be associated with a click of the mouse. The system can include a touchpad, and the dynamic noise can be associated with a click of the touchpad.

The dynamic audio signal filter can be configured to suppress the dynamic noise by muting the electrical audio signal for a period of time, $t_m$. The dynamic audio signal filter can be configured to suppress the dynamic noise by removing, from a portion of the electrical audio signal, frequency components characteristic of the dynamic noise.

In another aspect, an apparatus includes a housing, a plurality of mechanical keys housed by the housing, and a first microphone located within the housing and under the mechanical keys, the microphone being configured to detect a noise associated with a press of one of the keys.

Implementations can include one or more of the following features. For example, the apparatus can further include a base portion of a computing device, where the base portion includes the housing and the plurality of mechanical keys, and a display portion of the computing device moveably coupled to the base portion, with the display portion including a display bezel houses a second microphone.

The apparatus can include a touchpad, where the first microphone is located under the touchpad.

In another aspect, a method of suppressing dynamic noise in an audio signal includes detecting, with a first microphone, located within a housing and located proximate to a plurality of mechanical keys housed in the housing, a dynamic noise. Acoustic waves that include speech and the dynamic noise are detected with a second microphone, where the dynamic noise is not associated with the detected speech. The acoustic waves are converted into an electrical audio signal, and the dynamic noise is suppressed in the electrical audio signal with a dynamic noise filter, where the dynamic audio signal filter is activated in response to the first microphone detecting the dynamic noise.

Implementations can include one or more of the following features. For example, the dynamic noise can be associated with a stroke of one of the mechanical keys, with a click of a mouse, or with a click of a touchpad. The plurality of mechanical keys can be located at a distance, D, from the second microphone, and the dynamic audio signal filter can be d activated at a time, T, after the dynamic noise is generated. The time, T, can be based on a variance in the distance, D.

Suppressing the dynamic noise can include muting the electrical audio signal for a period of time, $t_m$. Suppressing the dynamic noise can include removing, from a portion of the electrical audio signal, frequency components characteristic of the dynamic noise.

In certain aspects, a system can include a first housing that houses a plurality of mechanical keys. A first means for detecting a dynamic noise is located within the first housing and under the mechanical keys. A second means is configured to detect acoustic waves that include speech and to convert the acoustic waves into an electrical audio signal. The dynamic noise is not associated with the detected speech. The system further includes a means for suppressing, in the electrical audio signal, dynamic noise, and the means for suppressing is activated in response to the first means detecting the dynamic noise.

Implementations can include one or more of the following features. For example, the dynamic noise can be associated with a stroke of one of the mechanical keys. The plurality of mechanical keys can be located at a distance, D, from the second means, and the means for suppressing can be activated at a time, T, after the generation of the dynamic noise, where the distance, D, varies and where the time, T, depends on the distance, D. The system can include a means for varying the time, T, based on an analysis of the electrical audio signal. The system can include a base portion, where the base portion includes the first housing and the plurality of mechanical keys, and a display portion that is moveably coupled to the base portion and that includes a display bezel, with the second means being housed in the display bezel.

The system can further include a second housing that houses a CPU and a keyboard peripheral to the second housing and operably connected to the CPU. The keyboard can include the first housing, the plurality of mechanical keys, and the first means, and the second means can be peripheral to the second housing and operably connected to the CPU. The system can further include a mouse, and the dynamic noise can be associated with a click of the mouse. The system can include a touchpad, and the dynamic noise can be associated with a click of the touchpad.

The means for suppressing can be configured to suppress the dynamic noise by muting the electrical audio signal for a period of time, $t_m$. The means for suppressing can be configured to suppress the dynamic noise by removing, from a portion of the electrical audio signal, frequency components characteristic of the dynamic noise.

In another aspect, an apparatus includes a housing, a plurality of mechanical keys housed by the housing, and a first means, located within the housing and under the mechanical keys, for detecting a noise associated with a press of one of the keys.

Implementations can include one or more of the following features. For example, the apparatus can further include a base portion of a computing device, where the base portion includes the housing and the plurality of mechanical keys, and a display portion of the computing device moveably coupled to the base portion, with the display portion including a display bezel houses a second means for detecting acoustic waves that include speech and for converting the acoustic waves into an electrical audio signal. The dynamic noise is not associated with the detected speech. The apparatus can include a touchpad, where the first means is located under the touchpad.

The details of one or more implementations are set forth in the accompanying drawings and the description below. Other features will be apparent from the description and drawings, and from the claims.

DETAILED DESCRIPTION

Figure 1:
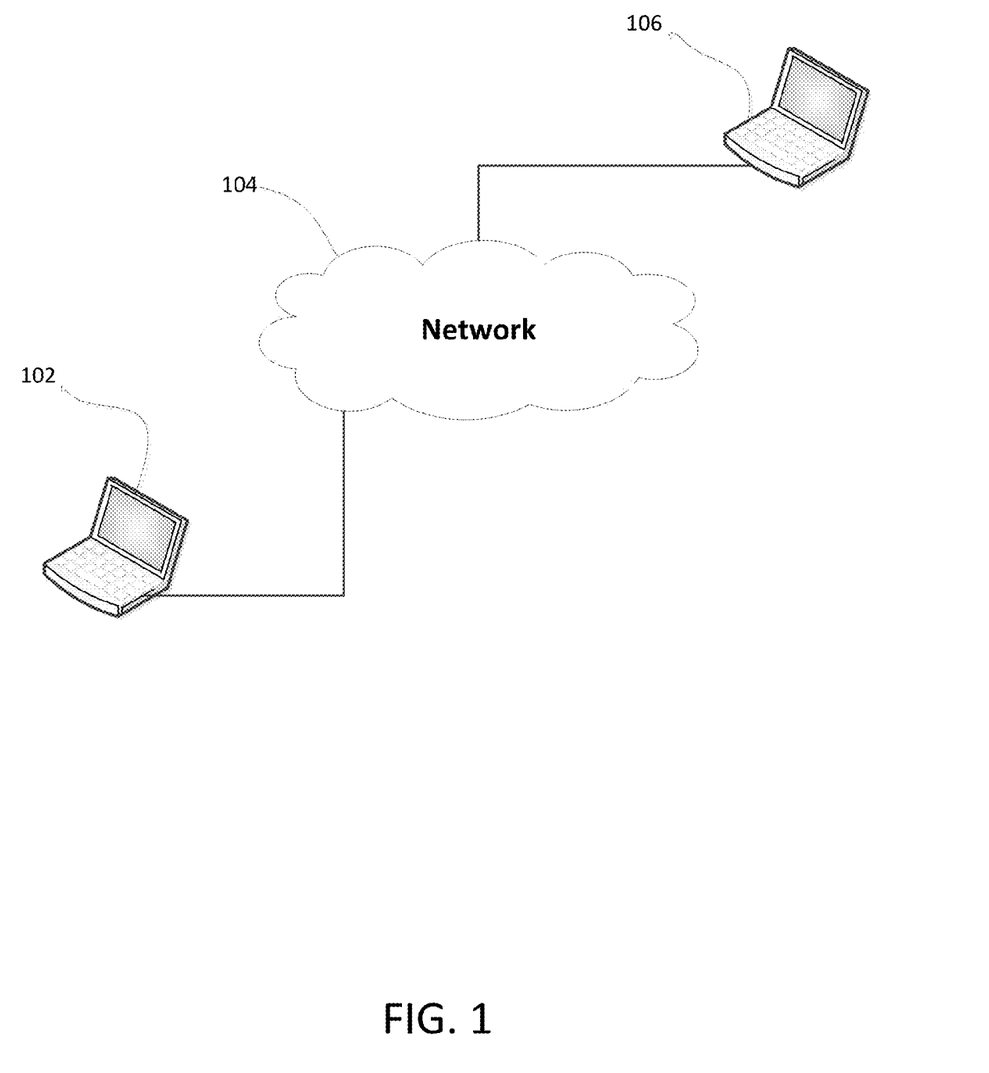
FIG. 1 is a schematic diagram of a system of networked computing systems.

FIG. 1 is a schematic diagram of a system 100 of networked computing systems. The system may include a first computing system 102 that communicates over a network 104 with a second computing system 106. The computing systems 102, 106 can include, for example, the personal computer, a tablet computer, a laptop or notebook computer, a gaming device, or a thin-client terminal that can connect to the network 104. The computing systems 102, 106 are configured to receive information from a user of the device and to communicate the information across the network 104 to another computing system. For example, the computing systems 102, 106 can include a microphone that receives audio input from a user, and the audio input can be converted into signals that are communicated across the network 104 to another computing system. The computing systems 102, 106 also can include one or more keyboards, track pads, mice, etc. for receiving input from a user. The network 104 can include a wide area network, such as, for example, the Internet or a local area network.

Figure 2:
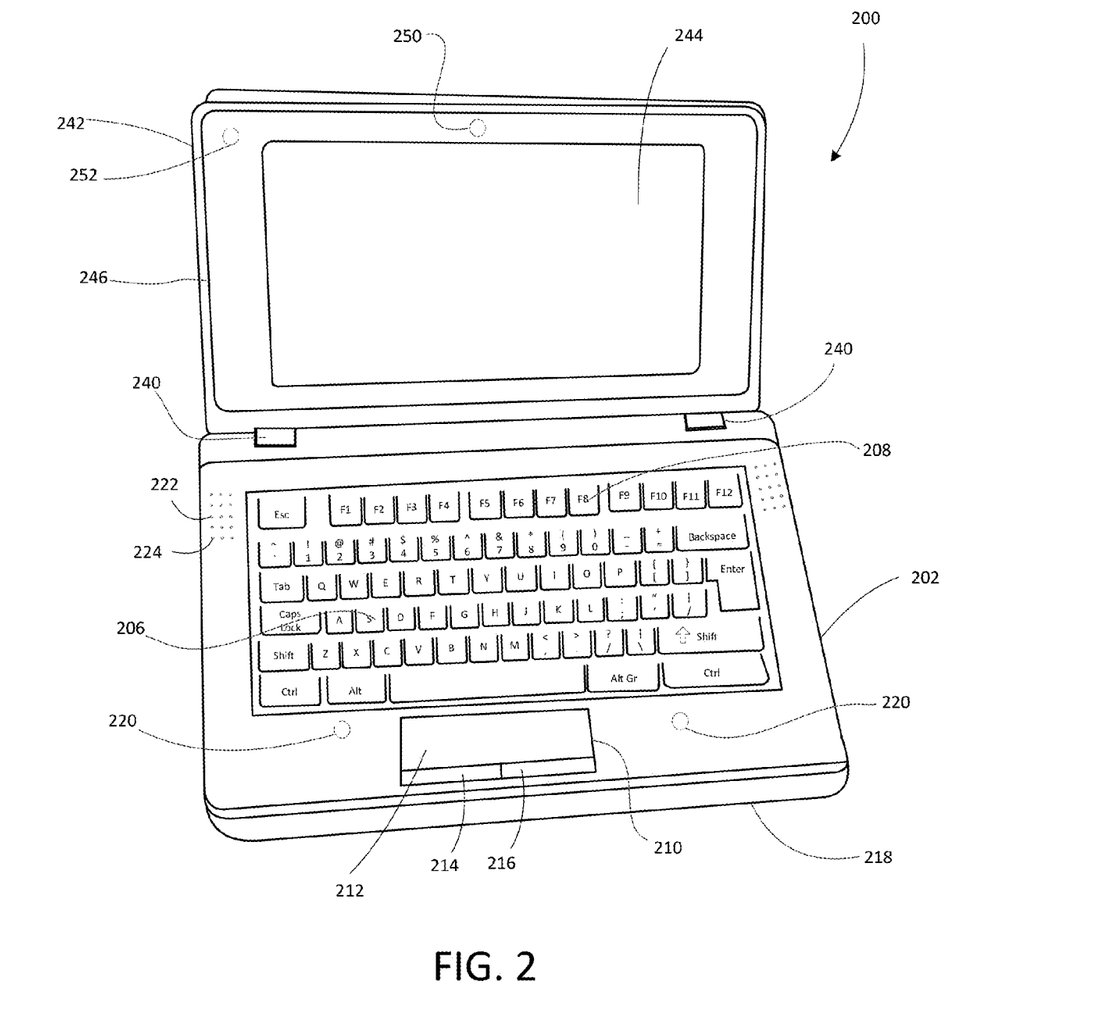
FIG. 2 is a perspective view of a computing system according to an example implementation.

FIG. 2 is a perspective view of a computing system 200 according to an example implementation. The computing system can include a base portion 202 and a display portion 242 that are moveably coupled to each other. For example, the base portion 202 can be coupled to the display portion 242 by a hinge 240, about which the base portion and the display portion can rotate relative to each other.

The base portion 202 can include a housing 204 that houses a number of components of the base portion. The housing 204 can include a variety of materials, including, for example, aluminum and plastic. The housing can house a keyboard 206 that includes a plurality of keys that can be used to input information into the computing system 200. The housing 204 can define one or more openings for the keys of the keyboard 206. The plurality of keys can be arranged in a variety of different layouts, for example, a QWERTY keyboard layout and can also include one or more function keys 208.

The base portion 202 also can include a touchpad assembly 210. In some implementations, the touchpad assembly 210 can include a first stationary portion 212 that can receive input indicative of movement of a cursor on a display of the display portion 242 and one or more movable portions 214, 216 that can receive input indicative of selection of a graphical user interface ("GUI") element on the display. Pressing on the movable portions 214, 216, respectively, can function similarly to pressing on the left and right buttons of a mouse. In other implementations, the touchpad assembly 210 can include a unified single portion that can receive inputs indicative of movement of a cursor on the display and selection of GUI elements on the display. For example, the unified single portion can be fixedly attached to the housing 204 at one edge of the single unified portion and movably attached to the housing 204 at an opposite edge of the single unified portion, and pressing on corners of the movable edge can indicate a selection of a GUI element on the display. Pressing on the opposite corners of the movable edge can function similarly to pressing on the left and right buttons of a mouse.

In computing system 200, the housing 204 can be an integral component of the system 200, and the keyboard 206 and the touchpad assembly 210 can be are housed within the housing. The housing 204 also can include one or more microphones that are configured to detect noise associated with use of the computing system 200 (e.g., noise associated with the press of one or more keys of the keyboard 206, noise associated with the press of the touchpad 210, etc.). In some implementations, as discussed in more detail below, the microphone(s) can be housed within the housing 204 under the keyboard 206 and above a bottom surface 218 of the housing 204. For example, the microphone(s) can be located directly below the keyboard 206 within the housing 204, or the microphone(s) can be located within the housing under the plane of the keys in the keyboard. One or more microphones also can be housed within the housing 204 under the trackpad assembly 210 to detect noise associated with activation of the trackpad. In other implementations, the microphone(s) 220 can be housed within the housing 204 on a surface of the housing 204, proximate to the keyboard 206 and/or proximate to the trackpad assembly 210.

The display portion 242 of the computing system 200 includes a display 244 for visually displaying information to a user of the system. The display 244 can be, for example, a liquid crystal display (LCD), a light emitting diode (LED) display, or other type of display device. The display 244 can be housed in a housing 246 that includes a bezel 248 around the perimeter of the display 244. The housing 246 and the bezel 248 can include a variety of materials, including, for example, metal, plastic, glass, etc.

The computing system 200 can include an image capture device 250 (or multiple image capture devices). In some implementations, the image capture device(s) 250 can be integrally housed within the display bezel 248 of the system 200. In some embodiments, the image capture device 250 can be, for example, a still image capture device, a video camera, a web cam, and/or so forth. The image capture device 250 can be configured to operate in conjunction with one or more computing functions associated with the computing system 200, for example, image capture applications, videoconferencing applications (e.g., video-phone applications), photo editing applications, security camera applications, and so forth.

The computing system 200 can include a microphone 252 that is configured to receive audio input from a user of the system. The microphone 252 can convert the audio input to signals that can be utilized by the computing system for a variety of applications, e.g., videoconferencing applications, telephony applications, audio recording applications, etc. In some implementations, the microphone 252 can be integrally housed within the bezel 248 of the display portion 242. In other implementations, the microphone can be coupled to, although not mechanically integrated within, the display portion 242 or the base portion 202. For example, the microphone may be coupled to the display portion or to the base portion wirelessly or through a cable (e.g., USB cable).

Figure 3:
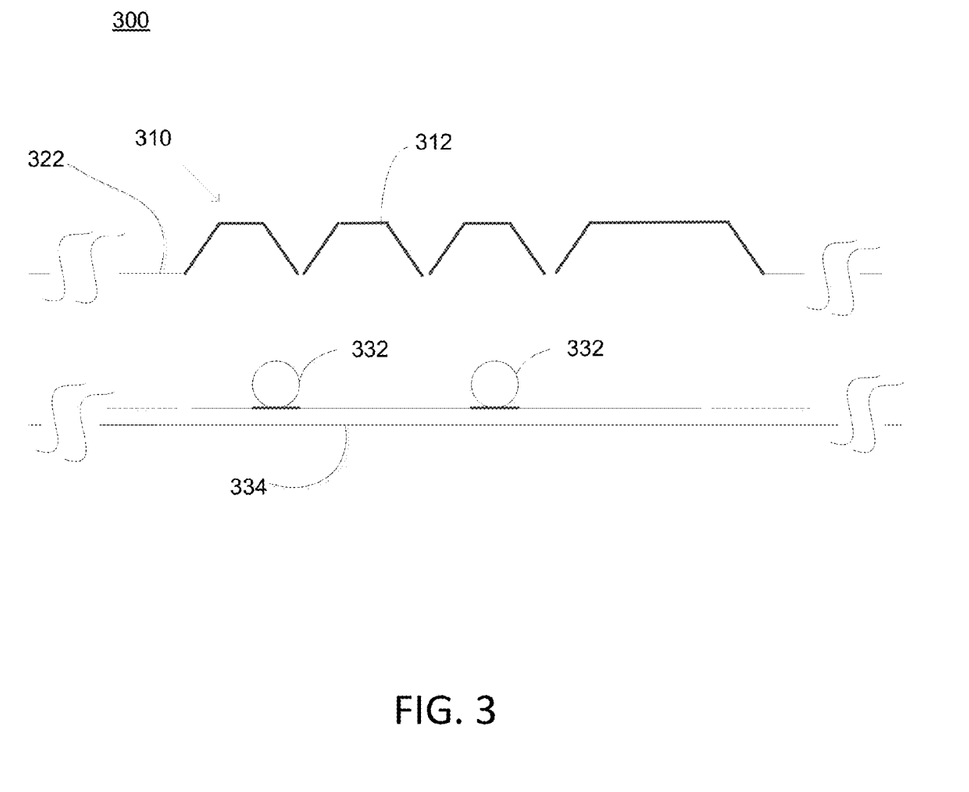
FIG. 3 is a schematic cross-sectional view of a portion of the keyboard portion of the base portion of the computing system of FIG. 2.

FIG. 3 is a schematic cross-sectional view of a portion of the keyboard portion 206 of the base portion 202 of the computing system 200. The keyboard 300 may, for example, include a front layer 310 of user-operable keys 312. User-operable keys 312, which may be based on electromechanical switch mechanisms (not shown), may be touch-operable (e.g., by pressing) by a user. For example, a user may actuate a key by pressing on a key to cause the key to travel downward into close, or open, and electrical switch when the key travels downward. The keys 312 may be housed within a housing that includes a top 322 and the bottom 334. One or more microphones 332 may be disposed within the housing under the top 322 and under the keys 312. These microphones 332 may be configured to detect a noise associated with the actuation of one or more of the keys 312.

Figure 4:
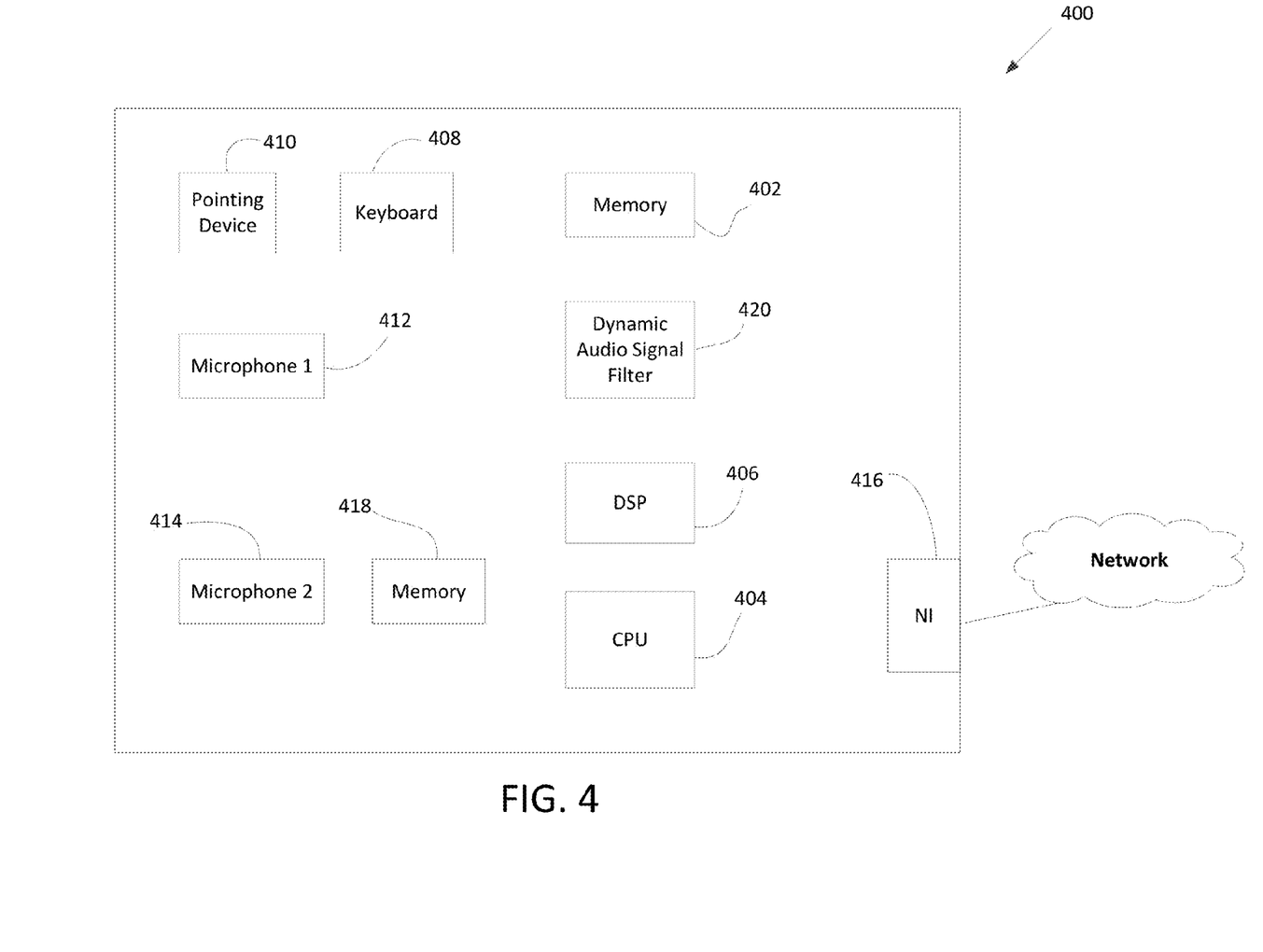
FIG. 4 is a schematic block diagram of a computing system.

FIG. 4 is a schematic block diagram of a computing system 400. The system 400 can include a memory 402 that is configured for storing executable instructions, a central processing unit ("CPU") 404, and a digital signal processor ("DSP") 406. The CPU 404 and the DSP 406 are operably coupled to each other and to the memory 402 and are configured to execute instructions stored in the memory. The computing system 400 includes a keyboard 408 and a pointing device (e.g., a mouse and/or a trackpad) 410 that can be used as input devices to receive input from a user of the computing system 400. The computing system 400 includes a first microphone 412 that can be disposed proximate to the keyboard 408 and/or the pointing device 410 and that can be configured to detect a noise associated with activation of the keyboard and/or the pointing device. The computing device 400 includes a second microphone 414 that can be configured to detect audio information. The computing device 400 can include a network interface ("NI") 416 that can connect the computing system 400 to a network 422 that links the system 400 to other computing systems. The computing system 400 also can include a memory 424 that can be used to record and store information. For example, the memory can record audio information received from the second microphone 414 after dynamic noise events have been removed from the signal by the dynamic audio signal filter 420.

In some implementations, the second microphone 414 detects not only information (i.e., signal) that a user desires to process with the computing system 400, but also some background noise that may interfere with the information. However, the background noise amongst the signal recorded by the second microphone can be suppressed by the CPU 404 and/or the DSP 406.

For example, the signal recorded by the second microphone 414 can be analyzed by the DSP 406 and/or the CPU 404 to detect periodic signals that correspond to a static background noise such as, for example, may be generated by a cooling fan within the system 400 or an external source of periodic noise. The static background noise can be characterized by one or more frequency components that exist in the signal recorded by the second microphone 414. The presence of particular frequency components in the signal that do not change significantly over time may indicate that those particular frequency components are caused by a source of noise, and are not part of an information signal. These particular frequency components that characterize a static background noise then can be suppressed from the signal that is output by the DSP 406 and/or the CPU 404, e.g., a signal that is output to the NIC 416 for transmission over a network to another computing system, or that is output to a memory 418.

In addition to static noise, dynamic noise that occurs briefly and generally unpredictably, also can be present and can be detected by the second microphone 414. For example, the clicking noise associated with typing on the keyboard 408 or with using the pointing device 410 can be a source of dynamic noise. Dynamic noise can be suppressed in the signal that is output from the DSP 406 and/or the CPU 404.

Differentiating between dynamic noise and signal associated with information in the signal generated by the second microphone 414 can be challenging. However, a signal from the first microphone 412 can be used to detect the presence of dynamic noise, e.g., noise associated with the stroke of a key on the keyboard 408 or noise associated with activation of the pointing device 410. In some implementations, the first microphone 412 can detect a dynamic noise and generate a signal in response to the detected dynamic noise, which is communicated to the DSP 406 and/or the CPU 404. When the DSP 406 and/or the CPU 404 receives the signal from the first microphone 412, the DSP and/or the CPU can use the signal to distinguish a portion of the signal received from the second microphone 414 as including a dynamic noise that is to be suppressed. Then, dynamic noise suppression techniques can be applied to the portion of the signal that has been identified as including the dynamic background noise. For example, a dynamic audio signal filter 420 configured to suppress, in the electrical audio signal, dynamic noise, can be activated in response to the first microphone detecting the dynamic noise. The dynamic audio signal filter can be implemented in hardware or software. For example, the dynamic audio signal filter can be hardwired as an application specific integrated circuit or as part of the DSP 406, or the dynamic audio signal filter can be executed by the DSP 406 and/or the CPU 404 in accordance with instructions stored in the memory 402.

In some implementations, the first microphone 412 can generate a signal indicating the presence of dynamic noise in response to a sound detected by the first microphone. For example, the signal can be generated by the first microphone 412 when the sound volume at the first microphone exceeds a threshold volume and/or when a change in the sound volume at the first microphone exceeds a threshold rate of change. Thus, the first microphone can be sensitive to transient noise (i.e., sound that occurs suddenly as opposed to general background white noise) and to noise that exceeds a threshold volume level. In this manner, a signal is generated in response to input to the first microphone 412 only when there is a reasonably high likelihood that the input to the first microphone was caused by a dynamic noise generated by the keyboard 408 and/or the pointing device 410 that are located proximate to the first microphone. As a consequence, input to the first microphone 412 will be relatively unlikely to initiate noise cancellation techniques on the signal received from the second microphone 414 unless dynamic noise is actually present in the signal received from the second microphone. In other words, "false positives" of dynamic noise detection can be reduced.

In some implementations, the threshold sound volume at the first microphone required to trigger a signal indicating the likelihood of the presence of dynamic noise may be adjustable. For example, the threshold may be adjustable by a user of the system 400. Then, the user may adjust the threshold level to a higher volume to avoid generating "false positives" that may interfere with the information signal that is input to the second microphone 414, or the user may adjust the threshold level to a lower volume to ensure a higher probability of detecting and suppressing dynamic noise events. In other implementations, the threshold may be adjustable automatically by the CPU 404, for example, in response to a level of background noise that is detected at the first microphone 412. In addition, the threshold level may be adjusted, either manually or automatically, to detect dynamic noise from loud typing on the keyboard 408 but not detect dynamic noise due to quiet typing on the keyboard.

When input to the first microphone 412 indicates, to the dynamic noise filter 420, the likelihood of dynamic noise in the signal received from the second microphone 414, the dynamic noise filter 420 can initiate noise suppression techniques on the signal received from the second microphone 414. For example, in some implementations, when a signal from the first microphone 412 indicates the likelihood of dynamic noise, the second microphone 414 may be temporarily muted e.g., for a period of time characteristic of sound associated with a stroke of a key on the keyboard 408 or associated with the actuation of the pointing device 410. The period of time characteristic of a dynamic noise, such as, for example, a keystroke or a click of a pointing device, can range from a fraction of a millisecond to a few milliseconds, which can be short enough so as not to negatively affect the signal of information (e.g. speech) detected by the second microphone 414 when the second microphone 414 is temporarily muted over this timescale.

In other implementations, the signal generated in response to input from the second microphone 414 can be electronically muted by the dynamic noise filter 420. For example, the dynamic noise filter 420 can electronically mute the signal that is output from the dynamic noise filter 420 over a time period that corresponds to the detected dynamic noise by setting the volume of that portion of the signal to zero.

In other implementations, audio frequency components characteristic of a predetermined dynamic noise can be subtracted from the signal that is output from the dynamic noise filter 420 over a time period that corresponds to the detected dynamic noise. For example, when inputs to the first microphone 412 are used to detect the presence of key presses on the keyboard 408, then frequency components corresponding to the sound a characteristic keypress makes at the second microphone 414 can be subtracted from the signal that is output from the dynamic noise filter 420 over time periods in the output signal that correspond to the detected keypresses.

When the first microphone 412 is located close to the source of dynamic noise (e.g., the keyboard 408 and/or the pointing device 410), and when the source of audio information (e.g., the mouth of a user who is speaking) being input to the second microphone 414 is located at a relatively larger distance from the second microphone, then the signal from the first microphone 412 that indicates the likelihood of a dynamic noise event may reach the DSP 406 and/or the CPU 404 before the dynamic noise event shows up in the signal from the second microphone 414 at the DSP and/or the CPU. For example, if the first microphone 412 is located 1 cm away from the keyboard 408, then it may take the sound of the keystroke approximately 30 µs to travel from the keyboard to the first microphone 412. However, if the second microphone 414 is 20 cm away from the keyboard 408, as may be the case in the notebook configuration of the computing system 200 shown in FIG. 2, then the sound of the keypress may take approximately 600 µs to travel from the keyboard to the second microphone 414. Because the electronic signals generated by the microphones 412, 414 travel to the DSP 406 and/or the CPU 404 at speeds much faster than the speed of sound, the signals corresponding to the dynamic noise event (e.g., the keypress) may reach the DSP and/or the CPU at a time interval roughly equivalent to the time interval between the arrival of the sound of the dynamic noise event at the two different microphones 412, 414. Because the signal from the first microphone 412 indicating a dynamic noise event arrives at the DSP 406 and/or the CPU 404 before the dynamic noise event in the signal from the second microphone 414 arrives, no delay in processing the signal from the second microphone is necessary when performing dynamic noise suppression on the signal received from the second microphone.

Furthermore, timing of the initiation of noise suppression techniques on the signal received from the second microphone 414 can be synchronized with the receipt of signals from the first microphone 412 indicating the existence of dynamic noise events. For example, statistical analysis, performed, for example, by the CPU 404, of the timing of signals from the first microphone 412 indicating the existence of dynamic noise events and signals from the second microphone 414 that include dynamic noise events can be used to determine how long after receipt of a signal from the first microphone 412 to activate the dynamic audio signal noise filter to suppress dynamic noise in the signal received from the second microphone 414. Then, the activation of the dynamic noise filter 420 can be delayed until it will operate on the portion of the signal from the second microphone 414 that actually includes the dynamic noise event. In this manner, the effect of the dynamic noise filter 420 on portions of the signal from the second microphone that do not include dynamic noise events can be reduced. In addition, the noise source can be located at a variable distance, D, from the second microphone 414. For example, if the second microphone 414 is a part of a webcam that is coupled to the keyboard 408 via a wireless link or a cord, such that the second microphone can be moved, the dynamic noise filter 420 can be activated at a time, T, after the generation of the dynamic noise, where the time, T, depends on the distance, D.

Figure 5:
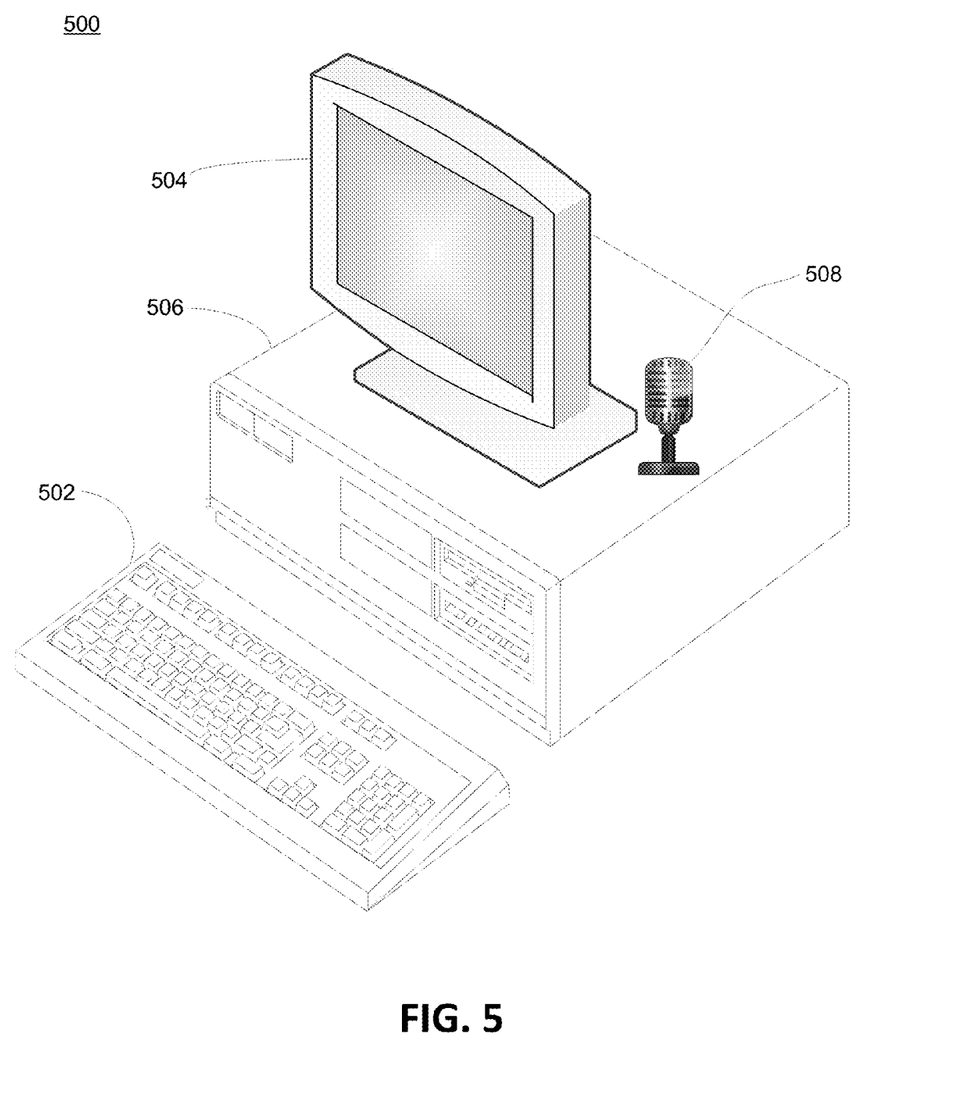
FIG. 5 is a perspective view of a computing system according to an example implementation.

FIG. 5 is a perspective view of a computing system 500 according to an example implementation. As shown in FIG. 5, the schematic system 400 shown in FIG. 4 can be implemented in a variety of ways. Although a "notebook" configuration is shown in FIG. 2, a "desktop" configuration is shown in FIG. 5. The system 500 includes a keyboard 502, a display 504, a housing 506 that houses processing components of the system 500, for example, a CPU, one or more memories, one or more digital signal processors, and a dynamic audio signal filter. The keyboard 502 can include an outer housing and a plurality of mechanical keys and a microphone that is located within the housing. The keyboard 502 can be operably coupled to the processing components of the system 500, either wirelessly or through a wired configuration. Similarly, the display 504 can be coupled to the processing components of the system 500 either wirelessly or through a wired configuration. The microphone 508 can be a dedicated microphone or can be integrated with a image capture device, for example, a web cam. The microphone 508 can be coupled to the processing components of the system 500, either wirelessly or through a wired configuration.

Figure 6:
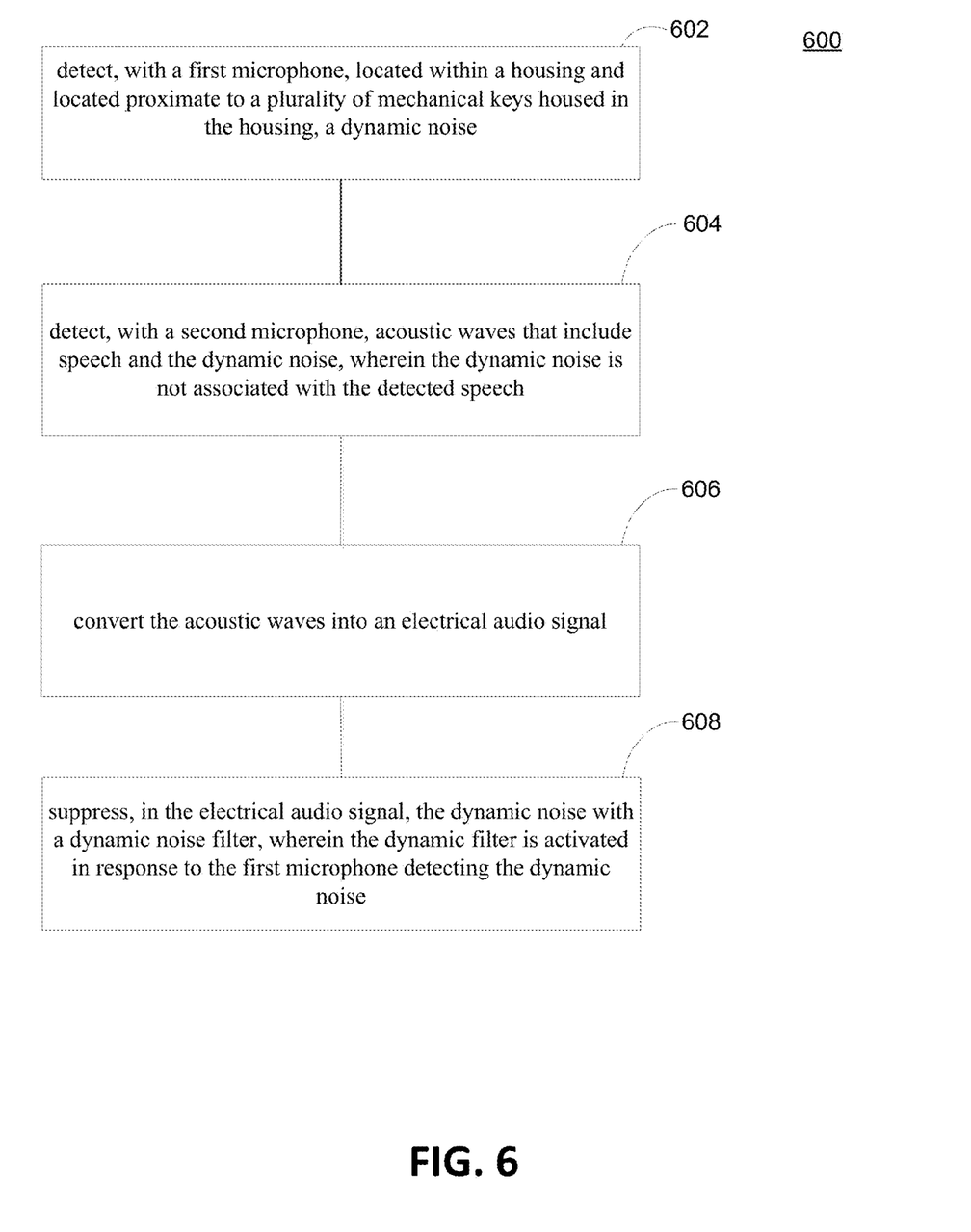
FIG. 6 is a flowchart that illustrates a method for suppressing dynamic noise.

FIG. 6 is a flowchart that illustrates a process 600 for suppressing dynamic noise. A dynamic noise is detected with a first microphone that is located within a housing located and proximate to a plurality of mechanical keys housed in the housing (602). Acoustic waves are detected with a second microphone, where the acoustic waves include speech and the dynamic noise, but where the dynamic noise is not associated with the detected speech (604). The acoustic waves are converted into an electrical audio signal (606), and the dynamic noise is suppressed in the electrical audio signal with a dynamic noise filter, where the dynamic noise filter is activated in response to the first microphone detecting the dynamic noise (608).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium), or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a light emitting diode (LED) (e.g., organic LED) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system, comprising:
a first housing;
a plurality of mechanical keys housed by the first housing;
a first microphone located within the first housing and under the mechanical keys, the microphone being configured to detect a dynamic noise;
a second microphone configured to detect acoustic waves that include speech and to convert the acoustic waves into an electrical audio signal, wherein the dynamic noise is not associated with the detected speech, wherein the mechanical keys are located closer to the first microphone than to the second microphone; and
a dynamic audio signal filter configured to suppress, in the electrical audio signal, dynamic noise, wherein the dynamic audio signal filter is activated in response to the first microphone detecting the dynamic noise, wherein the dynamic audio signal filter is activated at a time, T, after the generation of the dynamic noise and wherein the dynamic audio signal filter is activated for a period of time characteristic of the dynamic noise.

2. The system of claim 1, wherein the dynamic noise is associated with a stroke of one of the mechanical keys.

3. The system of claim 2,
wherein the plurality of mechanical keys are located at a distance, D, from the second microphone,
wherein the distance, D, varies and wherein the time, T, depends on the distance, D.

4. The system of claim 3, further comprising a processor configured to vary the time, T, based on an analysis of the electrical audio signal.

5. The system of claim 1, wherein the system further comprises:
a base portion, wherein the base portion includes the first housing and the plurality of mechanical keys; and
a display portion moveably coupled to the base portion, the display portion including a display bezel, wherein the second microphone is housed in the display bezel.

6. The system of claim 1, wherein the system further comprises:
second housing that houses a CPU; and
a keyboard peripheral to the second housing and operably connected to the CPU, wherein the keyboard includes the first housing, the plurality of mechanical keys, and the first microphone,
and wherein the second microphone is peripheral to the second housing and operably connected to the CPU.

7. The system of claim 1, further comprising:
a mouse; and
wherein the dynamic noise is associated with a click of the mouse.

8. The system of claim 1, further comprising:
a touchpad; and
wherein the dynamic noise is associated with a click of the touchpad.

9. The system of claim 1, wherein the dynamic audio signal filter is configured to suppress the dynamic noise by muting the electrical audio signal for a period of time, $t_m$.

10. The system of claim 1, wherein the dynamic audio signal filter is configured to suppress the dynamic noise by removing, from a portion of the electrical audio signal, frequency components characteristic of the dynamic noise.

11. An apparatus comprising
a housing;
a plurality of mechanical keys housed by the housing;
a first microphone located within the housing and under the mechanical keys, the microphone being configured to detect a noise associated with a press of one of the keys, and
a base portion of a computing device, wherein the base portion includes the housing and the plurality of mechanical keys;
a display portion of the computing device moveably coupled to the base portion, the display portion including a display bezel, wherein the display bezel houses a second microphone configured to detect acoustic waves that include speech and to convert the acoustic waves into an electrical audio signal, wherein the dynamic noise is not associated with the detected speech, and wherein the mechanical keys are located closer to the first microphone than to the second microphone; and
a dynamic audio signal filter configured to suppress, in the electrical audio signal, dynamic noise, wherein the dynamic audio signal filter is activated in response to the first microphone detecting the dynamic noise, wherein the dynamic audio signal filter is activated at a time, T, after the generation of the dynamic noise and wherein the dynamic audio signal filter is activated for a period of time characteristic of the dynamic noise.

12. The apparatus of claim 11, further comprising:
a touchpad,
wherein the first microphone is located under the touchpad.

13. A method of suppressing dynamic noise in an audio signal, the method comprising:
detecting, with a first microphone, located within a housing and located proximate to a plurality of mechanical keys housed in the housing, a dynamic noise;
detecting, with a second microphone that is located closer to the mechanical keys than the first microphone, acoustic waves that include speech and the dynamic noise, wherein the dynamic noise is not associated with the detected speech;
converting the acoustic waves into an electrical audio signal; and
suppressing, in the electrical audio signal, the dynamic noise with a dynamic noise filter, wherein the dynamic audio signal filter is activated in response to the first microphone detecting the dynamic noise at a time, T, after the generation of the dynamic noise and wherein the dynamic audio signal filter is activated for a period of time characteristic of the dynamic noise.

14. The method of claim 13, wherein the dynamic noise is associated with a stroke of one of the mechanical keys.

15. The method of claim 14, wherein the plurality of mechanical keys are located at a distance, D, from the second microphone, and the method further comprising:
activating the dynamic audio signal filter at a time, T, after the dynamic noise is generated; and
varying the time, T, based on a variance in the distance, D.

16. The method of claim 13, wherein the dynamic noise is associated with a click of a mouse.

17. The method of claim 13, wherein the dynamic noise is associated with a click of a touchpad.

18. The method of claim 13, wherein suppressing the dynamic noise includes muting the electrical audio signal for a period of time, $t_m$.

19. The method of claim 13, wherein suppressing the dynamic noise includes removing, from a portion of the electrical audio signal, frequency components characteristic of the dynamic noise.

* * * * *